(12) United States Patent
Park et al.

(10) Patent No.: US 12,555,363 B2
(45) Date of Patent: Feb. 17, 2026

(54) LEARNING DEVICE FOR GENERATING A COMPOSITE IMAGE SIMILAR TO A REAL IMAGE, A LEARNING METHOD THEREFOR, A TESTING DEVICE USING THE SAME, AND A TESTING METHOD USING THE SAME

(71) Applicants: HYUNDAI MOTOR COMPANY, Seoul (KR); KIA CORPORATION, Seoul (KR)

(72) Inventors: Hyun Kook Park, Seoul (KR); Jae Hoon Cho, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 349 days.

(21) Appl. No.: 18/367,253

(22) Filed: Sep. 12, 2023

(65) Prior Publication Data
US 2024/0355096 A1    Oct. 24, 2024

(30) Foreign Application Priority Data
Apr. 19, 2023 (KR) .......................... 10-2023-0051334

(51) Int. Cl.
*G06V 10/774* (2022.01)
*G06T 11/60* (2006.01)
(Continued)

(52) U.S. Cl.
CPC ............ *G06V 10/774* (2022.01); *G06T 11/60* (2013.01); *G06V 10/82* (2022.01); *G06V 20/54* (2022.01)

(58) Field of Classification Search
CPC .... G06T 11/60; G06V 10/764; G06V 10/774; G06V 10/82; G06V 20/54; G06V 20/56
See application file for complete search history.

(56) References Cited

U.S. PATENT DOCUMENTS

2019/0333198 A1*  10/2019  Wang ..................... G06N 3/088

FOREIGN PATENT DOCUMENTS

KR           102288759 B1     8/2021

OTHER PUBLICATIONS

Kai Xu et al., Learning in the Frequency Domain, Proceedings of the IEEE/CVF Conference on Computer Vision and Pattern Recognition (CVPR), 2020, pp. 1740-1749.
(Continued)

*Primary Examiner* — Manuchehr Rahmjoo
(74) *Attorney, Agent, or Firm* — Lempia Summerfield Katz LLC

(57) ABSTRACT

A learning device for generating a composite image similar to a real image, a learning method, a testing device for generating a training dataset, and a testing method are provided. The learning device includes a composite image generation network that applies a convolution operation to a simulation image at least once to generate a composite image. The learning device has a first discrimination network that applies a first discrimination operation to a first input image to generate a first discrimination score and has a second discrimination network that applies a second discrimination operation to a second input image to generate a second discrimination score. The learning device also includes a parameter update device that performs back-propagation of a first loss generated with reference to at least a portion of the first discrimination score or the second discrimination score to update a parameter of the composite image generation network.

10 Claims, 13 Drawing Sheets

(51) Int. Cl.
*G06V 10/82* (2022.01)
*G06V 20/54* (2022.01)

(56) References Cited

OTHER PUBLICATIONS

Ricard Durall et al., Watch your Up-Convolution: CNN Based Generative Deep Neural Networks are Failing to Reproduce Spectral Distributions, Proceedings of the IEEE/CVF Conference on Computer Vision and Pattern Recognition (CVPR), 2020, pp. 7890-7899.

Yunpeng Chen et al., Drop an Octave: Reducing Spatial Redundancy in Convolutional Neural Networks with Octave Convolution, Proceedings of the IEEE/CVF International Conference on Computer Vision (ICCV), 2019, pp. 3435-3444.

\* cited by examiner

LEARNING DEVICE FOR GENERATING A COMPOSITE IMAGE SIMILAR TO A REAL IMAGE, A LEARNING METHOD THEREFOR, A TESTING DEVICE USING THE SAME, AND A TESTING METHOD USING THE SAME

CROSS-REFERENCE TO RELATED APPLICATION

This application claims the benefit of priority to Korean Patent Application No. 10-2023-0051334, filed in the Korean Intellectual Property Office on Apr. 19, 2023, the entire contents of which are incorporated herein by reference.

TECHNICAL FIELD

The present disclosure relates to a learning device for generating a composite image similar to a real image, a learning method therefor, a testing device for generating training data using the same, and a testing method therefor.

BACKGROUND

Recently, with the development of computer vision technology based on the deep neural network in the autonomous driving technology, various artificial intelligence models, such as object detection, semantic segmentation, depth estimation, and lane detection, have been studied.

As a large amount of road images are obtained and labeling suitable for a goal of each artificial intelligence model (object recognition, segmentation, or the like) is performed for the large amount of road images, a large training dataset may be constructed. As supervised learning for the respective artificial intelligence models is performed using the training dataset, the performance of the artificial intelligence models may be successfully improved.

However, because it requires enormous expense, time, and manpower to obtain a large amount of road images including various road traffic situations and generate a sophisticated label suitable for several artificial intelligence models to construct a good training dataset, a bottleneck phenomenon occurs from the step of constructing the training dataset before training the artificial intelligence model in earnest.

For example, in a state where 500,000 real road images including road traffic situations in Republic of Korea are obtained, to perform labeling suitable for goals of n artificial intelligence models (e.g., an object recognition model, a segmentation model, a depth estimation model, and the like), because labeling for the 500,000 real road images should be performed for each of the n artificial intelligence models, labeling for a total of 500,000*n real road images should be performed. In addition, because road traffic situations are different from each other for each country, weather, or time zone, there is a need to separately construct a training dataset for each country, weather, or time zone. In this case, the cost of constructing a training dataset based on a real road image increases astronomically.

As a method for addressing it in the conventional technology, a method for obtaining a simulation road image using a simulation tool and constructing a training dataset based on the simulation road image through an automatic labeling function has been studied.

However, the conventional manner for constructing the training dataset based on the simulation road image has the following problems.

For example, referring to FIGS. 1A and 1B illustrating a simulation road image and a real road image, it may be seen that there is a clear difference (e.g., a contrast difference, an edge degree difference, a road environment difference, or the like) between the simulation road image of FIG. 1A and the real road image of FIG. 1B.

As such, because the feature of the simulation road image has many differences from the feature of the real road image, although an artificial intelligence model is trained using the training dataset constructed based on the simulation road image, the artificial intelligence model has poor performance for the real road image.

SUMMARY

The present disclosure has been made to solve the above-mentioned problems while advantages achieved by the prior art are maintained intact.

Aspects of the present disclosure provide a learning device for reflecting a characteristic of a real image in a simulation image to generate a composite image having the same or a similar feature or features to the real image, a learning method therefor, a testing device using the same, and a testing method using the same.

Other aspects of the present disclosure provide a learning device for saving costs and time taken to construct a training dataset for various road environments, a learning method therefor, a testing device using the same, and a testing method using the same.

The technical problems to be solved by the present disclosure are not limited to the aforementioned problems. Any other technical problems not mentioned herein should be more clearly understood from the following description by those having ordinary skill in the art to which the present disclosure pertains.

According to an aspect of the present disclosure, a learning device may include a composite image generation network that applies a convolution operation to a simulation image at least once to generate a composite image having the same or a similar feature or features to at least some of a plurality of real images. The learning device may also include a first discrimination network that applies a first discrimination operation to a first input image to generate a first discrimination score for whether the first input image is at least one of the real images or the composite image. The learning device may also include second discrimination network that applies a second discrimination operation to a second input image to generate a second discrimination score for whether the second input image is at least one of real conversion images or a composite conversion image. The real conversion images are generated as the real images are converted, and the composite conversion image is generated as the composite image is converted. The learning device may also include a parameter update device that performs back-propagation of a first loss generated with reference to at least a portion of the first discrimination score or the second discrimination score to update a parameter of the composite image generation network. The first loss corresponds to the composite image and the composite conversion image.

In an embodiment, the parameter update device may perform back-propagation of a second loss generated with reference to the first discrimination score and the second discrimination score to update parameters of the first discrimination network and the second discrimination network. The second loss corresponds to at least some of the real images, the real conversion images, the composite image, or the composite conversion image.

In an embodiment, the second loss may include a 2_1st loss and a 2_2nd loss. The 2_1st loss may be generated with reference to the first discrimination score and the 2_2nd loss may be generated with reference to the second discrimination score. The 2_1st loss may correspond to at least a portion of the real images or the composite image and the 2_2nd loss may correspond to at least a portion of the real conversion images or the composite conversion image.

In an embodiment, the real images may be images obtained in a specific road environment among first to nth road environments.

In an embodiment, the real conversion images may be images generated by converting the real images from a space domain to a frequency domain. The composite conversion image may be an image generated by converting the composite image from the space domain into the frequency domain.

According to another aspect of the present disclosure, a testing device may include a composite image generation network that applies a convolution operation to a simulation image for testing at least once to generate a composite image for testing. The composite image for testing may have the same or a similar feature or features to a real image for testing, and the real image corresponds to a road environment for testing. The testing device may also include a training data generator that reflects at least a portion of label information included in the simulation image for testing in the composite image for testing to generate training data corresponding to the road environment for testing.

According to another aspect of the present disclosure, a learning method may include applying a convolution operation to a simulation image at least once to generate a composite image having the same or a similar feature or features to at least some of a plurality of real images. The learning method may also include applying a first discrimination operation to a first input image to generate a first discrimination score for whether the first input image is at least one of the real images or the composite image. The learning method may also include applying a second discrimination operation to a second input image to generate a second discrimination score for whether the second input image is at least one of real conversion images or a composite conversion image. The real conversion images is generated as the real images are converted, and the composite conversion image is generated as the composite image is converted. The learning method may also include performing back-propagation of a first loss generated with reference to at least a portion of the first discrimination score or the second discrimination score to update a parameter of the composite image generation network. The first loss corresponds to the composite image and the composite conversion image.

In an embodiment, the updating of the parameter may include performing back-propagation of a second loss generated with reference to the first discrimination score and the second discrimination score to update parameters of the first discrimination network and the second discrimination network. The second loss may correspond to at least some of the real images, the real conversion images, the composite image, or the composite conversion image.

In an embodiment, the second loss may include a 2_1st loss and a 2_2nd loss. The 2_1st loss may be generated with reference to the first discrimination score and the 2_2nd loss may be generated with reference to the second discrimination score. The 2_1st loss may correspond to at least a portion of the real images or the composite image and the 2_2nd loss may correspond to at least a portion of the real conversion images or the composite conversion image.

In an embodiment, the real images may be images obtained in a specific road environment among first to nth road environments.

In an embodiment, the real conversion images may be images generated by converting the real images from a space domain to a frequency domain. The composite conversion image may be an image generated by converting the composite image from the space domain into the frequency domain.

According to another aspect of the present disclosure, a testing method may include applying a convolution operation to a simulation image for testing at least once to generate a composite image for testing. The composite image may have the same or a similar feature or features to a real image for testing and the real image may correspond to a road environment for testing. The testing method may also include reflecting at least a portion of label information included in the simulation image for testing in the composite image for testing to generate training data corresponding to the road environment for testing.

BRIEF DESCRIPTION OF THE DRAWINGS

The above and other objects, features, and advantages of the present disclosure should be more apparent from the following detailed description taken in conjunction with the accompanying drawings, in which.

Figure 1A:
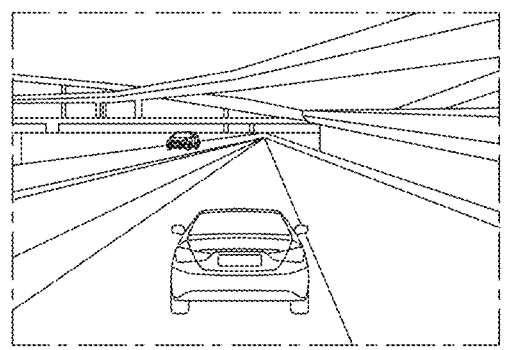
FIGS. 1A and 1B are drawings illustrating a simulation image and a real image.
Figure 1B:
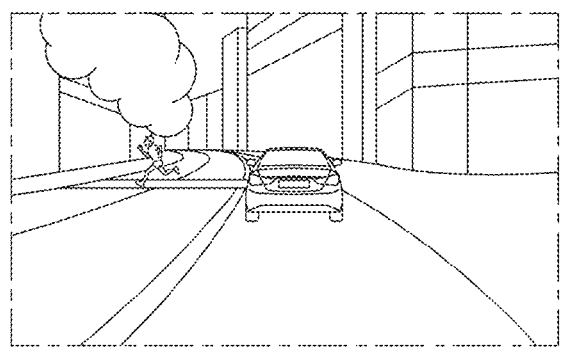

With regard to the description of the drawings, the same or similar denotations or reference characters may be used for the same or similar components throughout the drawings.

DETAILED DESCRIPTION

Hereinafter, some embodiments of the present disclosure are described in detail with reference to the accompanying drawings. In adding the reference numerals to the components of each drawing, it should be noted that the identical or equivalent components are designated by the identical numerals even when the components are displayed on other drawings. Further, in describing the embodiments of the present disclosure, a detailed description of well-known features or functions has been omitted in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence, or order of the corresponding components. Furthermore, unless otherwise defined, all terms including technical and scientific terms used herein have the same meaning as being generally understood by those having ordinary skill in the art to which the present disclosure pertains. Such terms as those defined in a generally used dictionary should be interpreted as having meanings consistent with the contextual meanings in the relevant field of art. Such terms should not be interpreted as having ideal or excessively formal meanings unless clearly defined as having such in the present application.

Hereinafter, embodiments of the present disclosure are described in detail with reference to FIGS. 2-9.

Figure 2:
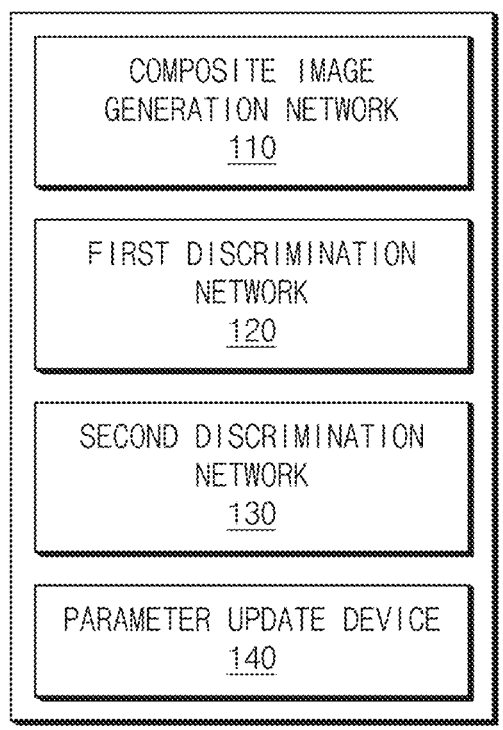
FIG. 2 is a block diagram illustrating a configuration of a learning device for generating a composite image similar to a real image according to an embodiment of the present disclosure.
Figure 3:
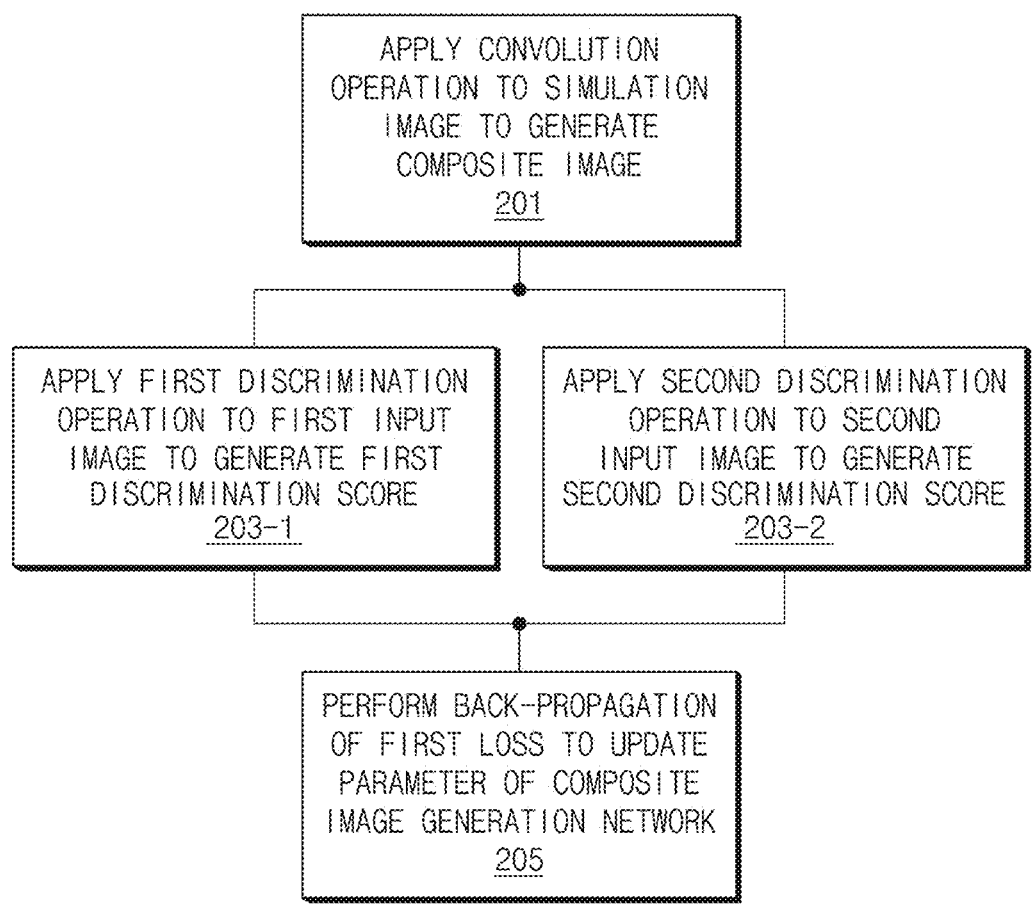
FIG. 3 is a flowchart for describing a learning method for generating a composite image similar to a real image according to an embodiment of the present disclosure.
Figure 4:
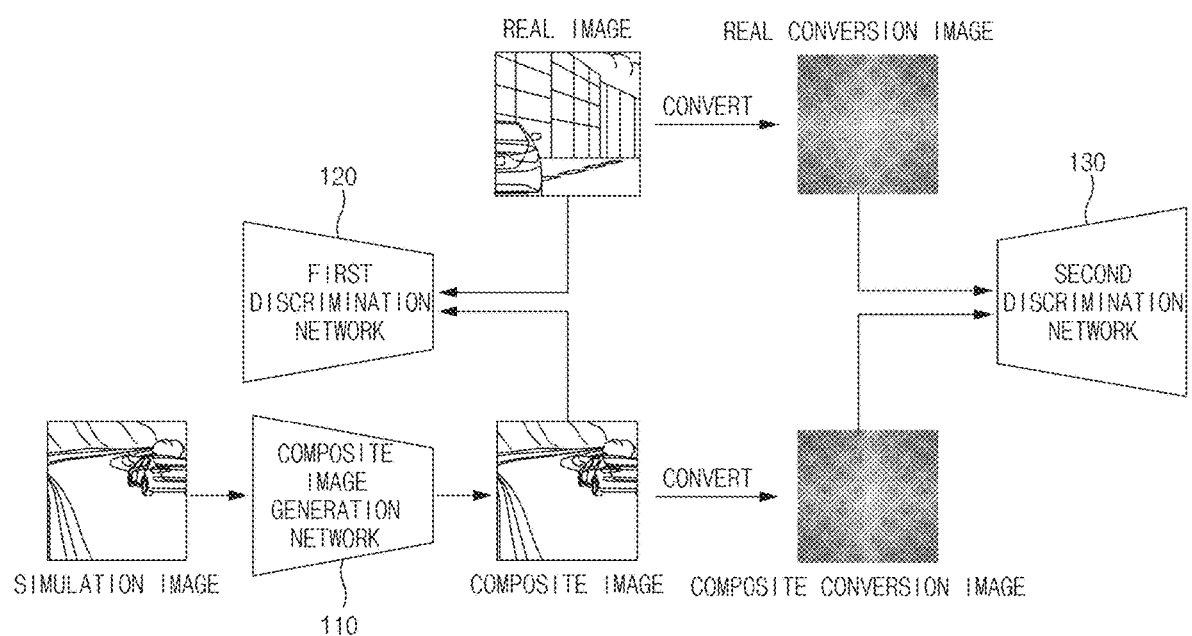
FIG. 4 is a drawing for describing an operation of a learning device for generating a composite image similar to a real image according to an embodiment of the present disclosure.

FIG. 2 is a block diagram illustrating a configuration of a learning device according to an embodiment of the disclosure. FIG. 3 is a flowchart for describing a learning method for generating a composite image similar to a real image according to an embodiment of the present disclosure. FIG. 4 is a drawing for describing an operation of a learning device for generating a composite image similar to a real image according to an embodiment of the present disclosure. FIGS. 5A-5D are drawings illustrating a simulation image, a real image, a composite conversion image, and a real conversion image.

Referring to FIG. 2, the learning device 100 according to an embodiment of the present disclosure may include a composite image generation network 110, a first discrimination network 120, a second discrimination network 130, and a parameter update device 140.

Operations of the plurality of networks and the parameter update device 140 included in the learning device 100 according to an embodiment of the present disclosure shown in FIG. 2 are described with reference to FIG. 3.

Referring to FIG. 3, in operation 201, the composite image generation network 110 may apply a convolution operation or operations to a simulation image at least once to generate a composite image having the same or a similar feature or features to at least a portion of a real image.

The real image may be an image obtained in a specific road environment among first to nth road environments.

Herein, the first to nth road environments may be road environments divided according to various criteria (e.g., a country, weather, a season, a region, a time, a type of the road, and the like). For example, because a shape/color/size of a line, a shape/color/size of a vehicle, or the like is able to be different for each country, the first road environment may be a road environment in the Republic of Korea, the second road environment may be a road environment in the United States, and the third road environment may be a road environment in Japan.

For reference, the criteria are an example to aid in understanding the technical concepts described herein, and the present disclosure is not limited to the example. For example, a road environment including objects with a low frequency of appearance (e.g., a vehicle with a bicycle suspended from the top or the rear, a vehicle driving in reverse, an illegally modified vehicle, a motorcycle with more than the permitted number of passengers on board, and the like) may be any one of the first to nth road environments.

Furthermore, the simulation image may be an image obtained by means of a simulation program or the like. Such a simulation image may be in a state where labeling for various tasks (e.g., object recognition, segmentation, depth estimation, and the like) is automatically achieved by an automatic labeling function of the simulation program.

Furthermore, the composite image may be an image having the same or a similar feature or features to at least some of a plurality of real images. For example, when the real image is an image obtained from a road in winter in the Republic of Korea, the real image may include a feature of the road in winter in the Republic of Korea (e.g., the reduced amount of sunshine, snow on the edge of the road, a line, a portion of which is hidden by snow, a shape/color/size of the line, or the like). The composite image may be an image generated to have the same or a similar feature or features to such a feature or features of the real image.

In operation 203-1, the first discrimination network 120 may apply a first discrimination operation or operations to a first input image to generate a first discrimination score for whether the first input image is at least one of the real images or the composite image.

In operation 203-2, the second discrimination network 130 may apply a second discrimination operation or operations to a second input image to generate a second discrimination score for whether the second input image is at least one of the real images or the composite image.

For reference, a real conversion image may be generated as the real image is converted. A composite conversion image may be generated as the composite image is converted.

In operation 205, the parameter update device 140 may perform back-propagation of a first loss generated with reference to at least a portion of the first discrimination score or the second discrimination score to update a parameter of the composite image generation network 110.

In other words, the learning device 100 according to the present disclosure may update a parameter to allow the composite image generation network 110 to generate a composite image (an image similar to the real image) where features of the real image are reflected in the simulation image.

For example, the learning device 100 may update a parameter to allow a first composite image generation network to generate first composite image(s) where features of at least some of first real images corresponding to the first road environment are reflected in first simulation image(s). Through the repetition of a similar process, the learning device 100 may update a parameter to allow an nth composite image generation network to generate nth composite image(s) where features of at least some of nth real images corresponding to an nth road environment are reflected in nth simulation image(s).

For reference, the first to nth simulation images may be, but are not limited to, different images and may be the same images. Although the first to nth simulation images are the same images, because the features of the first to nth real images are different from each other, the first to nth composite images where the features of the real images are reflected may be different from each other.

For reference, the composite image generation network 110 may be a generator of a generative adversarial network (GAN). The first discrimination network 120 and the second discrimination network 130 may be discriminators of the GAN.

For example, the composite image generation network 110 may be trained to find a feature distribution of the real image to be trained such that a feature distribution of a composite image generated using an input image (i.e., a simulation image) is the same as or similar to the feature distribution of the real image. The composite image generation network 110 may be trained to generate a composite image similar to the real image such that the first discrimination network 120 and the second discrimination network 130 incorrectly determine the composite image generated from the composite image generation network 110 as if it were the real image (i.e., such that the first discrimination network 120 and the second discrimination network 130 outputs "1" or a value close to "1").

Meanwhile, when it is determined that the input image is the real image, the first discrimination network 120 and the second discrimination network 130 may be trained to output a certain probability value (e.g., "1" or a value close to "1"). When it is determined that the input image is the composite image, the first discrimination network 120 and the second discrimination network 130 may be trained to output a certain probability value (e.g., "1" or a value close to "1").

Such a training process may be repeated until the first discrimination network 120 does not distinguish well the composite image from the real image. In other words, as the composite image generation network 110 generates the composite image to be similar to the real image, the first discrimination network 120 outputs "0.5" or a value close to "0.5" for the composite image. Also, the training process may be repeated until the second discrimination network 130 does not distinguish well the composite conversion image from the real conversion image. In other words, as the composite image generation network 110 generates the composite image to be similar to the real image, the second discrimination network 130 outputs "0.5" or a value close to "0.5" for the composite conversion image).

The configuration and the operation of the learning device 100 according to an embodiment of the present disclosure are schematically described above with reference to FIGS. 2 and 3. An operation of the learning device 100 according to an embodiment of the present disclosure is described below with reference to FIG. 4.

Referring to FIG. 4, the learning device 100 may apply a convolution operation or operations to a simulation image through a composite image generation network 110 at least once to generate a composite image having the same or a similar feature or features to at least some of a plurality of real images.

For example, the structure of the composite image generation network 110 may be a U-Net structure. For example, the composite image generation network 110 may pass the simulation image through a convolution layer and a ReLU layer and may then pass the simulation image through a residual-block, thus outputting a feature of the simulation image. The composite image generation network 110 may perform up-sampling under a skip-connection structure to generate an output (i.e., a composite image) corresponding to the feature of the simulation image. For reference, the structure of the composite image generation network 110 is an example to aid in understanding the technical concepts described herein, and the present disclosure is not limited to the structure. Any network capable of generating an image may be included in the composite image generation network 110 of the present disclosure.

The learning device 100 may input at least a portion of the real image or the composite image as a first input image to a first discrimination network 120. The learning device 100 may also input at least a portion of a real conversion image or a composite conversion image as a second input image to a second discrimination network 130.

At this time, the real conversion image may be an image generated by converting the real image from a space domain to a frequency domain. The composite conversion image may be an image generated by converting the composite image from the space domain into the frequency domain.

The real conversion image and the composite conversion image respectively corresponding to the real image and the composite image may be identified with reference to FIG. 4.

For example, the real conversion image may be generated by performing discrete Fourier transform for the real image. The composite conversion image may be generated by performing discrete Fourier transform for the composite image.

However, converting the real image and the composite image from the space domain to the frequency domain is an example to aid in understanding the technical concepts described herein, and the present disclosure is not limited thereto. For example, the real conversion image may be generated by performing discrete wavelet transform for the real image and the composite conversion image may be generated by performing discrete wavelet transform for the composite image.

For reference, the discrete wavelet transform may be a transform scheme that transforms the overall portion of an image at a time, with regard to a characteristic where a person first identifies the entire contour in looking at a thing and then focuses on details. Thus, according to the discrete wavelet transform, the loss of information may be reduced, and transform may be performed to suit human visual characteristics.

Furthermore, each of the first discrimination network 120 and the second discrimination network 130 may have the same structure as a discriminator model of a generative adversarial network (GAN).

For example, the first discrimination network 120 may sequentially pass an input image (i.e., at least one of the real image or the composite image) through a convolution layer and a LeakyReLU layer to output a feature for the input image. The first discrimination network 120 may also pass the feature through a fully-connected layer to generate a first discrimination score for whether the input image is the real image or the composite image.

For example, the second discrimination network 130 may sequentially pass an input image (i.e., at least one of the real conversion image or the composite conversion image) through a convolution layer and a LeakyReLU layer to output a feature for the input image. The second discrimination network 130 may also pass the feature through a fully-connected layer to generate a second discrimination score for whether the input image is the real conversion image or the composite conversion image.

The learning device 100 may perform back-propagation of a first loss generated with reference to at least a portion of the first discrimination score or the second discrimination score to update a parameter of the composite image generation network 110.

For reference, the first loss may correspond to the composite image and the composite conversion image. In other words, the first loss may be generated with reference to the first discrimination score of the first discrimination network 120 for the composite image and the second discrimination score for the second discrimination network 130 for the composite conversion image.

For example, the first loss may be generated according to Equation 1 below.

$$L_G = \frac{1}{2}\left(E_X\left[(D_p(G(X)) - 1)^2\right] + E_X\left[(D_f(DFT(G(X))) - 1)^2\right]\right) \quad \text{Equation 1}$$

For reference, X refers to the simulation image, Y refers to the real image, G(X) refers to the composite image, DFT refers to the discrete Fourier transform function, $D_f$ refers to the second discrimination network, $D_p$ refers to the first discrimination network, and E refers to the expectation.

The learning device 100 may update parameters of the first discrimination network 120 and the second discrimination network 130.

When the first discrimination score for the first input image is generated from the first discrimination network 120 and the second discrimination score of the second input image is generated from the second discrimination network 130, the learning device 100 may perform back-propagation of a second loss generated with reference to the first discrimination score and the second discrimination score by means of a parameter update device 140 to update parameters of the first discrimination network 120 and the second discrimination network 130.

At this time, the second loss may correspond to at least some of the real image, the real conversion image, the composite image, or the composite conversion image.

For example, the second loss may include a 2_1st loss and a 2_2nd loss. The 2_1st loss may be generated with reference to the first discrimination score and the 2_2 loss may be generated with reference to the second discrimination score.

For example, the second loss may be generated according to Equation 2 below.

$$L_D = \frac{1}{2}\left(L_{D_p} + L_{D_f}\right) \quad \text{Equation 2}$$

For reference, $L_D$ refers to the second loss, $L_{D_p}$ refers to the 2_1st loss, and $L_{D_f}$ refers to the 2_2nd loss.

At this time, the 2_1st loss and the 2_2nd loss may be generated according to Equations 3 and 4 below, respectively.

$$L_{D_p} = E_Y\left[(D_p(Y) - 1)^2\right] + E_X\left[(D_p(G(X)))^2\right] \quad \text{Equation 3}$$

$$L_{D_f} = E_Y\left[(D_f(DFT(Y)) - 1)^2\right] + E_X\left[(D_f(DFT(G(X))))^2\right] \quad \text{Equation 4}$$

For reference, the 2_1st loss may correspond to at least a portion of the real image or the composite image and the 2_2nd loss may correspond to at least a portion of the real conversion image or the composite conversion image.

In other words, the 2_1st loss may be generated with reference to the first discrimination score of the first discrimination network 120 for at least a portion of the real image or the composite image. The 2_2nd loss may be generated with reference to the second discrimination score of the second discrimination network 130 for at least a portion of the real conversion image or the composite conversion image.

As the 2_1 loss is used, the first discrimination network 120 may be trained. As the 2_2nd loss is used, the second discrimination network 130 may be trained.

For reference, referring to FIGS. 5A-5D, it may be seen that a difference in brightness and color is relatively clear between a simulation image (FIG. 5A) and a real image (FIG. 5B) in a pixel domain. Meanwhile, it may be seen that there is no significant difference in the degree of expression of the edge of an object between the simulation image (FIG. 5A) and the real image (FIG. 5B) in the pixel domain.

Figure 5A:
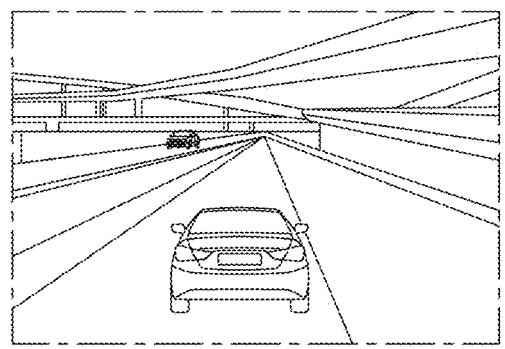
FIGS. 5A, 5B, 5C, and 5D are drawings illustrating a simulation image, a real image, a composite conversion image, and a real conversion image.
Figure 5B:
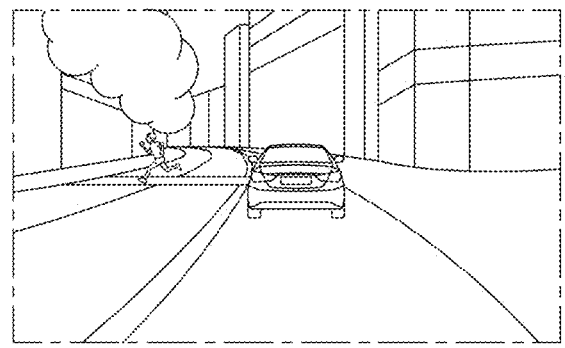
Figure 5C:
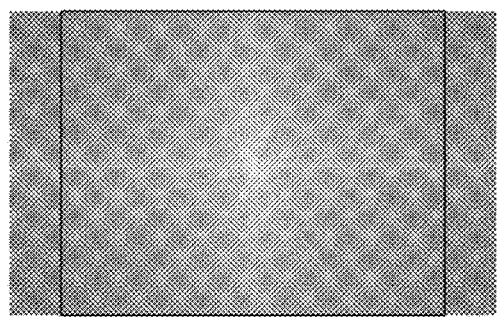
Figure 5D:
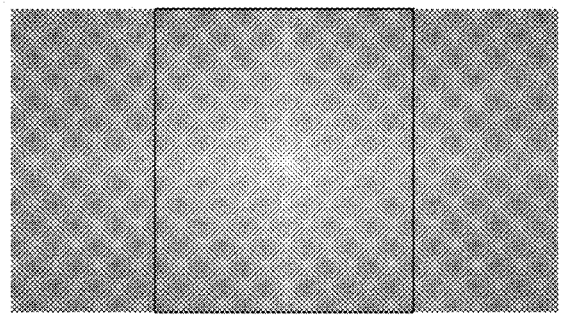

On the other hand, FIGS. 5C and 5D are results converted into a frequency domain for the same simulation image and real image. It may be seen that there is a clear difference in the degree of expression of an edge of an object between a simulation conversion image (FIG. 5C) and a real conversion image (FIG. 5D) (particularly, the inside of a box displayed in red).

In such a situation, when learning proceeds using only the first discrimination network 120 about a pixel domain without the second discrimination network 130 about a frequency domain, it may be difficult to learn a difference between a real image and a simulation image, which are difficult to be distinguished in the pixel domain (e.g., the degree of expression of an edge of an object in the real image).

To overcome the above problem, according to the present disclosure, as a difference between the real image and the simulation image is learned even in a domain (e.g., a frequency domain) different from the pixel domain by means of the second discrimination network 130, a composite image more similar to the real image may be generated.

For example, the composite image generation network 110, the training of which is completed, may generate a composite image more similar to the real image using a simulation image in which the edge of the object is excessively clear and bright.

As such, in a state where parameters of at least some of the composite image generation network 110, the first discrimination network 120, or the second discrimination network 130 are updated, the case where the present disclosure is applied to real testing (e.g., a process of generating a composite image similar to the real image using the simulation image and generating training data using the composite image) is described below.

For reference, a process of additionally training the composite image generation network 110 using the first discrimination network 120, the second discrimination network 130, and the parameter update device 140 is not essential in a real testing operation. Thus, a testing device according to an embodiment of the present disclosure may include a composite image generation network, the training of which is completed. Furthermore, the testing device may further include a training data generator for reflecting label information of the simulation image in a composite image for testing, which is generated from the composite image generation network, to quickly generate a large amount of training data at a low cost.

Figure 6:
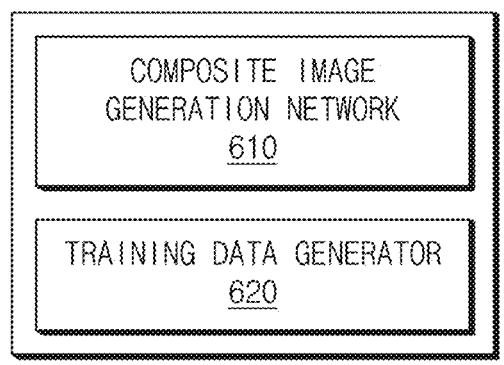
FIG. 6 is a block diagram illustrating a configuration of a testing device for generating training data according to an embodiment of the present disclosure.
Figure 7:
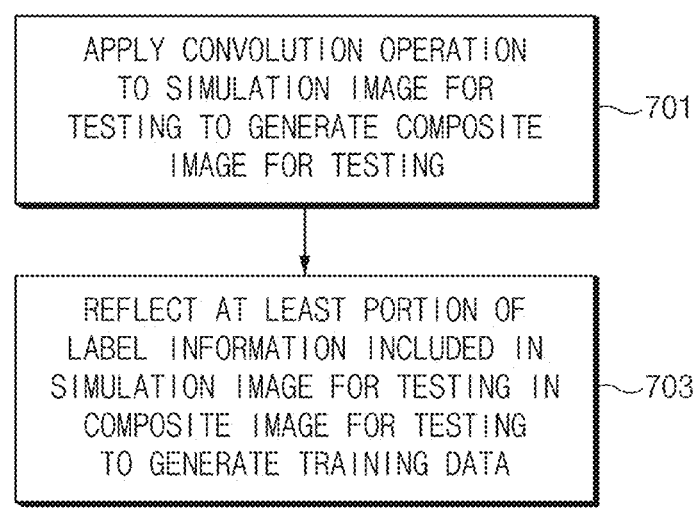
FIG. 7 is a flowchart for describing a testing method for generating training data according to an embodiment of the present disclosure.
Figure 8:
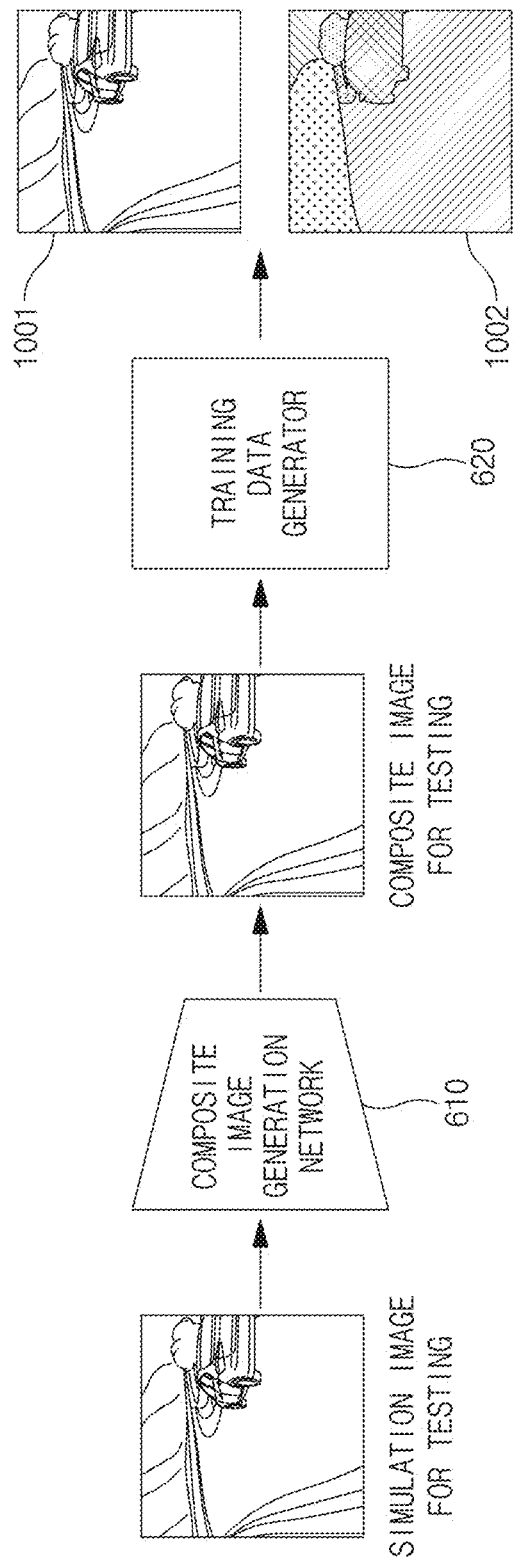
FIG. 8 is a drawing for describing an operation of a testing device for generating training data according to an embodiment of the present disclosure.
Figure 9:
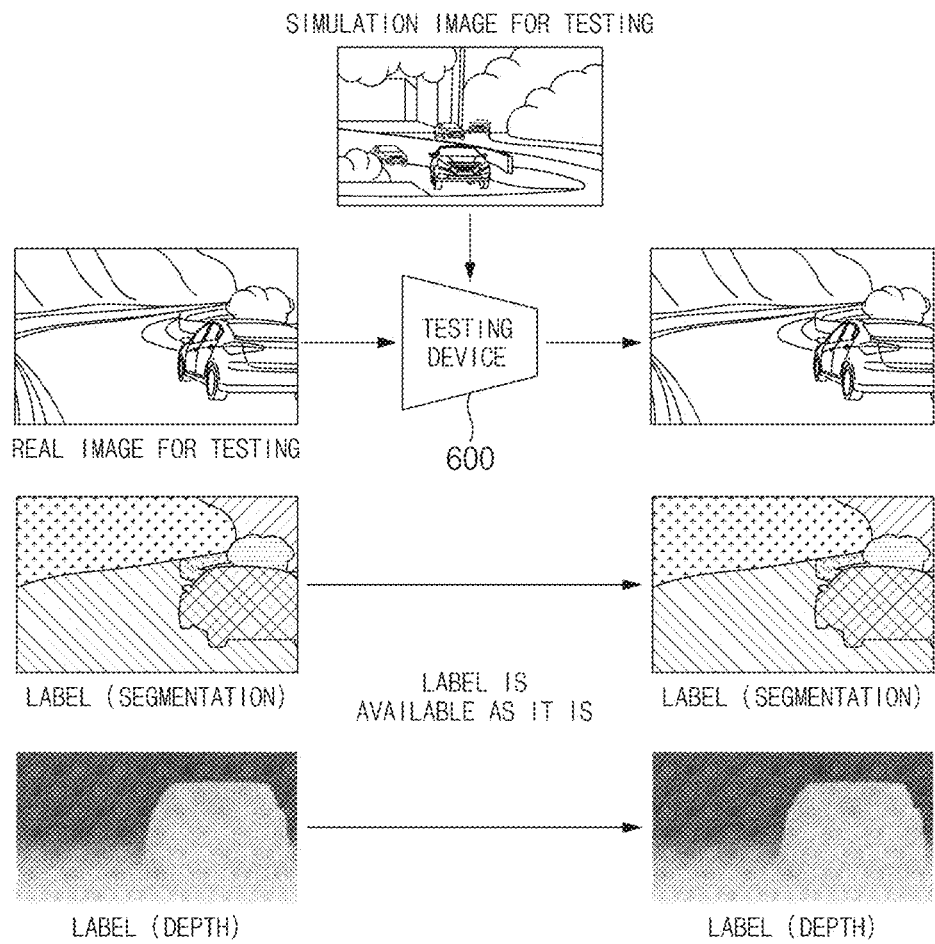
FIG. 9 is a drawing schematically illustrating a training dataset generated by a testing device for generating training data according to an embodiment of the present disclosure.

FIG. 6 is a block diagram illustrating a configuration of a testing device 600 according to an embodiment of the disclosure. FIG. 7 is a flowchart for describing a testing method for generating training data according to an embodiment of the present disclosure. FIG. 8 is a drawing for describing an operation of a testing device for generating training data according to an embodiment of the present disclosure. FIG. 9 is a drawing schematically illustrating a training dataset generated by a testing device for generating training data according to an embodiment of the present disclosure.

Referring to FIG. 6, a testing device 600 according to an embodiment of the present disclosure may include a composite image generation network 610 and a training data generator 620.

An operation of the testing device 600 according to an embodiment of the present disclosure shown in FIG. 6 is described with reference to FIG. 7.

Referring to FIG. 7, in operation 701, the composite image generation network 610 may apply a convolution operation or operations to a simulation image for testing to generate a composite image for testing.

In operation 703, the training data generator 620 may reflect at least a portion of label information included in the simulation image for testing in the composite image for testing to generate training data.

The configuration and the operation of the testing device 600 according to an embodiment of the present disclosure are schematically described above with reference to FIGS. 6 and 7. An operation of the testing device 600 according to an embodiment of the present disclosure is described below with reference to FIG. 8.

Referring to FIG. 8, the testing device 600 may input a simulation image for testing to the composite image generation network 610.

The testing device 600 may apply a convolution operation or operations to the simulation image for testing at least once through the composite image generation network 610 to generate a composite image for testing, which has the same or a similar feature or features to a real image for testing, and which corresponds to a road environment for testing.

For reference, the composite image generation network 610 may be in a state where it is trained to reflect a feature of the real image corresponding to the road environment for testing in the simulation image.

It may be seen that a composite image for testing in FIG. 8 is generated to have a similar feature to the road environment for testing. For example, it may be seen that a centerline is yellow in the simulation image for testing and the intensity of the entire image is excessively large. In contrast, a color of a line and intensity of the image are changed to have a similar feature to the road environment for testing in the composite image for testing.

The testing device 600 may reflect at least a portion of label information included in the simulation image for testing in the composite image for testing to generate training data corresponding to the road environment for testing by means of the training data generator 620.

For example, referring to FIG. 8, it may be seen that the training data generator 620 reflects at least a portion of the label information included in the simulation image in the composite image for testing to generate training data 1001 including segmentation label information 1002.

In an existing technology, for example, to generate 500,000 pieces of training data for each of n tasks, labeling should be separately performed for each of n tasks for 500,000 real images. A huge amount of time and cost was thus wasted.

On the other hand, according to the present disclosure, as shown in FIG. 9, to generate 500,000 pieces of training data for each of n tasks (e.g., a segmentation task and a depth estimation task), at least a portion of label information included in advance in 500,000 simulation images for 500,000 composite images generated from the 500,000 simulation images is reflected to construct training dataset every n tasks at a quick and low cost.

For reference, referring to FIG. 9, it may be seen that the testing device 600 reflects the same or a similar feature or features to the real image for testing in the simulation image for testing to generate training data. Those having ordinary skill in the art may easily understand that the real image for testing is not input to the testing device 600.

The present technology may provide the learning device for reflecting a characteristic of a real image in a simulation image to generate a composite image having the same or a similar feature or features to the real image, the learning method therefor, the testing device using the same, and the testing method using the same.

Furthermore, the present technology may provide the learning device for saving cost and the time taken to construct a training dataset for various road environments, the learning method therefor, the testing device using the same, and the testing method using the same.

In addition, various effects ascertained directly or indirectly through the present disclosure may be provided.

Hereinabove, although the present disclosure has been described with reference to embodiments and the accompanying drawings, the present disclosure is not limited thereto. The embodiments described herein may be variously modified and altered by those having ordinary skill in the art to which the present disclosure pertains without departing from the spirit and scope of the present disclosure claimed in the following claims.

Therefore, the embodiments of the present disclosure are provided to explain the spirit and scope of the present disclosure, but not to limit them. Thus, the spirit and scope of the present disclosure is not limited by the embodiments. The scope of the present disclosure should be construed on the basis of the accompanying claims, and all the technical ideas within the scope equivalent to the claims should be included in the scope of the present disclosure.

What is claimed is:

1. A testing device including a parameter updated by a learning device, the testing device comprising:
a composite image generation network configured to apply a convolution operation to a simulation image for testing at least once to generate a composite image for testing, the composite image for testing having a same or similar feature to a real image for testing of a plurality of real images, the real image for testing corresponding to a road environment for testing; and
a training data generator configured to reflect at least a portion of label information included in the simulation image for testing in the composite image for testing to generate training data corresponding to the road environment for testing,
wherein the learning device includes:
a first discrimination network configured to apply a first discrimination operation to a first input image to generate a first discrimination score for whether the first input image is at least one real image of the plurality of real images or the composite image,
a second discrimination network configured to apply a second discrimination operation to a second input image to generate a second discrimination score for whether the second input image is at least one conversion image of real conversion images or a composite conversion image, the real conversion images being generated as the plurality of real images are converted and the composite conversion image being generated as the composite image is converted, and a parameter update device configured to perform back-propagation of a first loss generated with reference to at least a portion of the first discrimination score or the second discrimination score to update a parameter of the composite image generation network, the first loss corresponding to the composite image and the composite conversion image.

2. The testing device of claim 1, wherein;

the parameter update device performs back-propagation of a second loss generated with reference to the first discrimination score and the second discrimination score to update parameters of the first discrimination network and the second discrimination network; and the second loss corresponds to at least some real images of the plurality of real images, the real conversion images, the composite image, or the composite conversion image.

3. The testing device of claim 2, wherein;

the second loss includes a 2_1st loss and a 2_2nd loss;

the 2_1st loss is generated with reference to the first discrimination score, and the 2_2nd loss is generated with reference to the second discrimination score; and the 2_1st loss corresponds to at least a portion of the plurality of real images or the composite image, and the 2_2nd loss corresponds to at least a portion of the real conversion images or the composite conversion image.

4. The testing device of claim 1, wherein the plurality of real images are images obtained in a specific road environment among first to nth road environments.

5. The testing device of claim 1, wherein:

the real conversion images are images generated by converting the plurality of real images from a space domain to a frequency domain; and the composite conversion image is an image generated by converting the composite image from the space domain into the frequency domain.

6. A testing method using a parameter updated by performing a learning method, the testing method comprising:

applying a convolution operation to a simulation image for testing at least once to generate a composite image for testing, the composite image for testing having a same or similar feature to a real image for testing of a plurality of real images, the real image for testing corresponding to a road environment for testing; and reflecting at least a portion of label information included in the simulation image for testing in the composite image for testing to generate training data corresponding to the road environment for testing, wherein the method includes:

applying a convolution operation to a simulation image at least once to generate a composite image having a same or similar feature to at least some real images of a plurality of real images;

applying a first discrimination operation to a first input image to generate a first discrimination score for whether the first input image is at least one real image of the plurality of real images or the composite image, applying a second discrimination operation to a second input image to generate a second discrimination score for whether the second input image is at least one real conversion image of real conversion images or a composite conversion image, the real conversion images being generated as the plurality of real images are converted and the composite conversion image being generated as the composite image is converted, and performing back-propagation of a first loss generated with reference to at least a portion of the first discrimination score or the second discrimination score to update a parameter of the composite image generation network, the first loss corresponding to the composite image and the composite conversion image.

7. The testing method of claim 6, wherein updating the parameter includes:

updating the parameter includes performing back-propagation of a second loss generated with reference to the first discrimination score and the second discrimination score to update parameters of the first discrimination network and the second discrimination network; and the second loss corresponds corresponding to at least some real images of the plurality of real images, the real conversion images, the composite image, or the composite conversion image.

8. The testing method of claim 7, wherein:

the second loss includes a 2_1st loss and a 2_2nd loss;

the 2_1st loss is generated with reference to the first discrimination score, and the 2_2nd loss is generated with reference to the second discrimination score; and the 2_1st loss corresponds to at least a portion of the plurality of real images or the composite image, and the 2_2nd loss corresponds to at least a portion of the real conversion images or the composite conversion image.

9. The testing method of claim 6 wherein the plurality of real images are images obtained in a specific road environment among first to nth road environments.

10. The testing method of claim 6, wherein:

the real conversion images are images generated by converting the plurality of real images from a space domain to a frequency domain; and the composite conversion image is an image generated by converting the composite image from the space domain into the frequency domain.

* * * * *